United States Patent [19]
Evans

[11] Patent Number: 4,504,778
[45] Date of Patent: Mar. 12, 1985

[54] SELF-POWERED, SELF-REGULATED, ELECTRONIC AC CONTROL SYSTEM

[75] Inventor: Wayne W. Evans, Roswell, Ga.

[73] Assignee: Electronic Systems International, Inc., Norcross, Ga.

[21] Appl. No.: 398,325

[22] Filed: Jul. 15, 1982

[51] Int. Cl.³ .............................................. G05F 5/00
[52] U.S. Cl. ............................. 323/323; 307/252 B; 323/321; 323/324
[58] Field of Search ............... 323/300, 324, 321, 323, 323/238, 239; 307/252 B

[56] References Cited

U.S. PATENT DOCUMENTS

| | | | |
|---|---|---|---|
| 3,328,606 | 6/1967 | Pinckaers | 307/252 B |
| 4,011,498 | 3/1977 | Hamstra | 323/238 |
| 4,121,149 | 10/1978 | Seltzer | 323/323 |
| 4,224,563 | 9/1980 | Hardy | 323/300 |

FOREIGN PATENT DOCUMENTS 55-136718  10/1980  Japan .............................. 307/252 B

OTHER PUBLICATIONS

Manners, "I.C.-Triac Timer", Radio & Electronics Constructor, vol. 27, No. 10, pp. 618-621, May 1974.

Primary Examiner—William H. Beha, Jr.
Attorney, Agent, or Firm—Louis T. Isaf

[57] ABSTRACT

A system of controlling the operation of an AC load with a switch placed in series with the load, which switch is itself operated by dc control logic powered by power loss experienced by the switch which the logic controls. Numerous elements in the control system perform multiple functions allowing the control logic to remain alive during both the on and off mode of the switch without power being provided to the logic by separate conductors to the AC power source, such that the control system is completely self powered and self regulated by simply placing the system, with two wires, into a series loop with the AC power source and the load.

10 Claims, 9 Drawing Figures

SELF-POWERED, SELF-REGULATED, ELECTRONIC AC CONTROL SYSTEM

FIELD OF THE INVENTION

This invention relates generally to the field of electronic control systems and more specifically to switching devices for controlling the operation of a load.

BACKGROUND OF THE INVENTION

Present AC control systems utilize mechanical relays consuming reasonably extensive amounts of power to activate them. Some systems are now utilizing electronic relays requiring somewhat less power, but such relays still require in the range of possibly tens to hundreds of milliamps of current to activate. To turn the AC power on and off to a load such as a relay, gas valve, light or heater, at least three wires are required by the prior art. One wire is the "hot" power in from the AC power source to both the control system and the power switching device. The second wire is the return from the switching device through the load. The third wire is the common from the control system to the AC power source. Both the hot and the common are required in order to operate a dc power supply necessary to drive the logic of the control system which in turn drives the power switching device in series with the load. In many cases, this common or third wire is not available where the control system is chosen to be located. An example of where such situations arise is in the case of a home energy management system, wherein a power switching device is to be placed in series with a 24 volt or 120 volt thermostat mounted on the wall, which thermostat traditionally is in a simple series loop between the 24 volt power source and the load. The control system which drives the switching device must receive dc power as outlined above. If an additional wire is available for the common, no significant problem exists, but in many cases a separate wire must be run.

In addition, a pilot light or ON indicator is traditionally used. This is generally placed in some position across the control logic power supply, and, therefore, is in parallel with the load, and thus is an additional power or current load on the power supply. If the control logic requires a sample of the AC signal for timing or synchronizing purposes, this generally requires a halfwave rectifier in order to create positive polarity pulses compatible with the logic. At times these timing pulses must also be amplitude limited so as to not overdrive the control logic. In addition, some degree of added regulation is generally required so that the power supply maintains operation during both high and low AC line voltage. In the prior art, each of these functions required separate circuitry, each creating a load on the power source. All of this tends to create a relatively inefficient, moderately energy consuming product such that the energy required to turn on a power switching device may be as much as 1/10th the actual power being switched. As an example, some 24 volt AC energy management systems require two to four hundred milliamps of current to control a one to two amp contactor or relay. If the control circutry used has any timing mechanism that must remain functioning during an AC power outage, a battery back-up supply is usually employed. The life of this battery is inversely related to the power consumption of the system that is doing the timing. So, a list of negatives exists with current products: extra power supply wires; extra timing and regulator circuits; extra current for on/off indicators; and relatively poor efficiency in terms of power input verses power control, resulting in very limited battery back-up operating time. In addition, a power fuse is needed to protect the control circuitry from excessive power surges and protect the power source itself from a control system fault which may cause improper connection between the hot and common leads.

SUMMARY OF THE INVENTION

Briefly described, the present invention comprises an electronic control system which utilizes the voltage drop across a switching device to actually provide power to the control circuitry which turns the swithing device on and off in the first place. The control system includes a very low power electronic logic circuitry similiar to that currently used in liquid crystal digital wrist watches and calculators. Those devices are usually powered by a simple 1½ volt battery. The switching device of the present invention which is turned on and off by the control system comprises a bidirectional thyristor such as a low cost triac, generally called a bidirectional triode thyristor (see U.S. Pat. No. 3,275,909). Back to back silicon controlled rectifiers (SCR's) could also be used. As is commonly known, such thyristors have a characteristic voltage drop or "loss" (known as the "on-state voltage") between the main terminals when turned on, generally in the area of 1½ volts AC (RMS). Furthermore, the thyristor is characterized by a "peak off-state voltage" across the main terminals of the thyristor which exceeds the on-state voltage and is developed before the thyristor turns on. Dominant characteristics of the thyristor affecting the "peak off-state voltage" are the device's gate current and gate voltage. The thyristor is turned on from a non-conducting state to a current conducting state in three general ways known in the art. One of the methods used to turn on the thyristor, and that method to which this disclosure of the preferred embodiment will relate, is to apply a proper "gate signal" (as discussed later) to the thyristor. Once turned on by application of the proper gate signal, the thyristor will go into and remain in a high conduction mode, provided that the current between the two main terminals ("principal current") remains in excess of a minimum value called the "holding current". Once the principal current drops below the holding current, the thyristor "turns off" into a non-conducting mode, to be turned on again as by re-application of the proper gate signal. It is noted that the thyristor requires somewhat more voltage and current to turn it on than to keep it on.

The present invention takes advantage of the variable voltage-current turn on/turn off characteristics of the thyristor, and utilizes the inherent voltage drops between the thyristor terminal pairs to provide power to the control circuitry that turns this thyristor switching device on and off in the first place. Throughout this disclosure (including the Claims), references to voltage providing power to the control circuitry (or similar references) are used to indicate that, as a practical matter, voltage drops across the triac 19 will appear as a voltage source and current will be available as needed. The invention further comprises a combination of resistors and diodes placed across the terminals of the thyristor in such a relationship as to control the gate signal of the thyristor. The control system itself is comprised of this resistor-diode combination in addition to the control logic, a full-wave bridge rectifier and filter capacitor. The control system circuitry functions to force the voltage across the main terminals of the thyristor to reach a desired voltage before it can turn on. This desired turn on voltage shall be termed the minimum threshold off-state voltage or threshold voltage which, in the present invention is generally greater than the characteristic peak off-state voltage of the thyristor used. The threshold voltage developed across the thyristor provides the extra input to the internal power supply of the control system needed to keep the system operating while the thyristor is on while having a minimum effect upon the RMS voltage and current delivered to the load being controlled. The higher the efficiency and the lower the power consumption of the control system, the less the threshold voltage required to keep the control system functioning while the thyristor is on. The invention further functions to selectively vary the impedance of the control system to selectively turn the thyristor on and off.

It is, therefore, an object of the present invention to provide an electronic AC control system including a controlled switching device used to control a load, which system is, upon application of an AC voltage from the load power source, indefinitely powered independent of whether the switching device is on or off, without requiring a power source separate from the load power source or separate wires to the load power source.

Another object of the present invention is to provide a control system including a switching device for controlling a load, which control system utilizes the voltage drop, enhanced if necessary, across the switching device to provide the power needed by the control system which turns the switching device on and off in the first place.

Yet another object of the present invention is to provide a control system including a switching device to control a load, which system applies its own power and also regulates itself over the entire AC voltage range normally applied to the load.

Still another object of the present invention is to provide an on/off pilot light for a control system which light consumes no additional power and which light actually contributes to the shaping and isolation of a synchronizing signal to the control logic.

Another object of the present invention is to provide a control system in which numerous elements perform multiple functions to increase the efficiency and lower the power consumption of the system.

Another object of the present invention is to provide a variable time-cycle or duty-cycle control device containing its own timer which appears to an external circuit as a two wire device. Thus the control device may be inserted at virtually any location in an existing two wire control loop.

Other objects, features and advantages of the present invention will become apparent upon reading the following specification, when taking in conjunction with the accompanying drawings.

DETAILED DESCRIPTION OF THE PREFERRED EMBODIMENT

Figure 1:
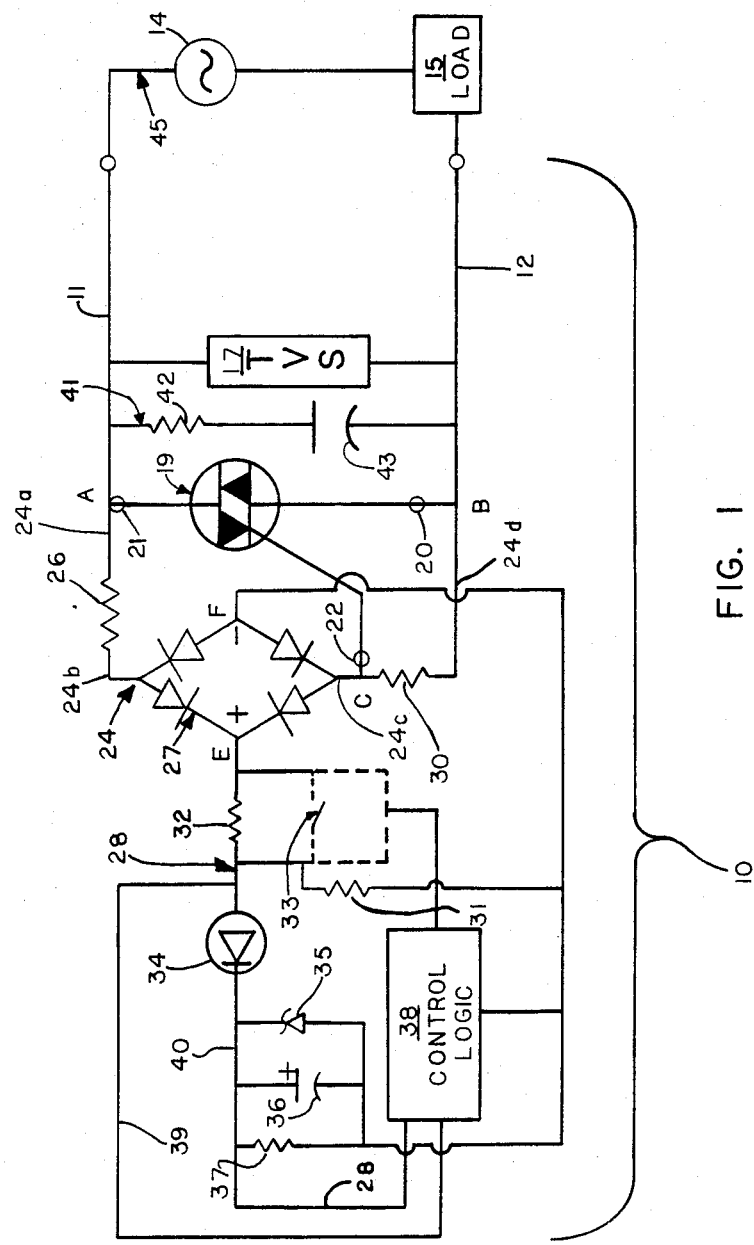
FIG. 1, is a schematic diagram of the circuit of the self-powered, self-regulated, electronic AC control system in accordance with the preferred embodiment of the present invention.

Referring now in greater detail to the drawing, FIG. 1 presents a circuit representation of the preferred embodiment of the self-powered, self-regulated, electronic AC control system 10 in accordance with the present invention. The control system 10 comprises a circuit developed about two lead wires 11, 12 by which the control system 10 is connected in series with an AC power source 14 and a load 15. The AC power source 14 could, for example, be a 24 volt source produced by a transformer, which source is supplying electrical power to an air conditioning or furnace relay 15 (the load). The power source 14 could also be a 120 volt, 240 volt or other source available to the user; and the load may be a heater, light bulb, or other load which is to be controlled with minor changes in a few component valves.

Components found in the preferred embodiment of FIG. 1 include a transient voltage suppressor (TVS) 17 connected between the two lead wires 11, 12. A bidirectional thyristor 19 is connected between the lead wires 11, 12 in parallel to the TVS 17. The thyristor 19 of the preferred embodiment is a "triac", also known as a bidirectional triode thyristor which identifies a triode AC simiconductor switch which is triggered into conduction by a gate signal. Information on the triac may be found in U.S. Pat. No. 3,275,909. Although the preferred embodiment calls for a triac, back to back silicon controlled rectifiers (SCR's) or devices exhibiting similar characteristics may be used. The triac terminals will be indicated, for purposes of this description, as main terminal 20, main terminal 21 and gate terminal (gate) 22. In the preferred embodiment, as seen in the figure, main terminal 21 is connected to lead wire 11 at point A and main terminal 20 is connected to lead wire 12 at point B. Control system circuitry for controlling the on/off operation of the triac 19 is connected to the two main terminals 20, 21 of the triac at point A and point B within a parallel circuit 24 including branch conductors 24a, 24b, 24c and 24d. The gate terminal 22 of the triac 19 is connected to the branch conductor 24c of the parallel circuit 24 at point C. A first resistor 26 is placed in the parallel circuit 24 between conductors 24a and 24b. In series with the first resistor 26 between conductor 24b and point C at conductor 24c is a full-wave bridge rectifier 27 of a type typically known in the art. In typical manner, a branch of unidirectional current is created in the rectifier 27 between points E and F and this branch shall, for purposes of this disclosure, be termed the unidirectional branch (UD branch) 28. For ease of examination, the UD branch 28 has been drawn outside of the rectifier diamond (to the left side of point E), but it is understood that all elements drawn to the left side of point E exist in reality between points E and F. A second resistor 30 is connected in the parallel circuit 24 between point C of conductor 24c and the conductor 24d. That is, this second resistor 30 is connected between the gate terminal 22 and main terminal 20 of the triac 19.

Positioned in the UD branch 28 is a third resistor 32. A logic switch 33 is in parallel with the third resistor 32. The logic switch 33 is shown in the figure as a contact for ease of understanding. Actually, in the preferred embodiment, the logic switch 33 is a transistor, although it may be any other logic type switch which performs the desired function. A light emitting diode (LED) 34 is placed in the UD branch 28 in series with the parallel combination of third resistor 32 and its logic switch 33. At the LED 34, the unidirectional branch 28 is separated into two sections: the timing pulse branch 39 leaves the UD branch 28 to the positive side of the LED 34; and the dc branch 40 is that branch which connects to the negative side of the LED. Following the LED 34, in series therewith, are a zener diode 35 and a capacitor 36 in parallel relationship to one another. A signal resistor 31 is placed in the UD branch 28 between the anode of the LED 34 and point F. The power supply resistor 37 is placed in the dc branch 28 in parallel combination with the capacitor 36 and zener diode 35. Control logic 38, which controls the logic switch 33 and of which the logic switch 33 is a part, is provided operating power through the dc branch 28. The timing pulse branch 39 leaving the UD branch 28 to the anode side of the LED 34 conducts timing pulses to the control logic 38. The control logic 38 is not described herein as its internal components are not felt to be necessary to an understanding of the present invention. However, certain functions and input and output parameters, such as power consumption, of the control logic 38 will have effect on value specifications of certain other circuit elements within the control system 10 and preferred functions and parameters will be discussed, relative to the preferred embodiment, below. An RC circuit 41, including resistor 42 and capacitor 43 in series, is shown in the figure in parallel with the triac 19. This RC circuit 41 is placed in the preferred embodiment when the load 15 is an inductive load; and may generally be omitted when the load is a resistance load.

Choosing circuit element specifications. When choosing the values of certain key elements of the control system circuitry, and in developing different circuit arrangements which may have equivalent functions and which are within the scope of the present invention, the following rules and descriptions regarding the present invention should be born in mind. These rules and descriptions should not be considered exhaustive of the functions and relationships of the elements of the present invention; nor are the elements listed in A–I below to be considered the only "key" elements of the invention.

A. The triac 19 is characterized by a gate trigger current ($I_{gt}$) which is the minimum current required to switch the triac from the off (non-conducting) state to the on (current-conducting) state; and a gate trigger voltage ($V_{gt}$) which is the voltage developed across the gate (in the preferred embodiment, voltage across gate terminal 22 and main terminal 20) required to produce the gate trigger current.

B. A function of the control logic 38 is to selectively, open and close the logic switch 33 to place the third resistor 32 in and out, respectively, of the dc branch 28 (un-shorting and shorting the resistor 32) to turn the triac off then on. In the preferred embodiment, this opening and closing of the logic switch 33 is done at timed intervals.

C. There must always be enough power (Voltage X Current) available across the dc branch 28 to power the control logic 38, whether the triac 19 is off or on, but should not overload the logic circuitry.

D. Excluding all the constant voltage drops across the diodes, the first resistor 26 and the second resistor 30 are the main elements in determining the current flow through the parallel circuit 24 when the third resistor 32 is shorted by the logic switch 33. Resistor 26 and resistor 30 are balanced to assure that, when resistor 32 is shorted out, there will be sufficient gate trigger voltage and gate trigger current to turn the triac 19 on. Resistor 26 should be low enough to ensure that sufficient voltage drop is available to develop the gate trigger voltage across resistor 30 with resistor 32 shorted; and small enough to prevent starvation of current to the zener 35 and capacitor 36; and low enough to ensure a sufficiently high gate trigger current. At the same time, resistor 26 should be large enough to limit current through branch 28 so as not to overstress the LED 34 and zener 35. This should be born in mind especially in view of the high line and low line variations in typical AC power supplies. Resistor 30 is chosen relative to resistor 26 such that the voltage developed across resistor 30 will be equal to or greater than the gate trigger voltage, under both low line and high line conditions of the AC power source.

E. The third resistor 32 is chosen relative to resistor 30 so that when resistor 32 is "un-shorted" the voltage drop across resistor 32 will be so large that the voltage developed across the second resistor 30 will be below the gate trigger voltage and the triac 19 will not turn on. Therefore, resistor 32 should be large relative to resistor 30 to keep the triac 19 off under highest AC line voltage conditions; yet resistor 32 must be small enough to ensure that sufficient current flows to the zener 35 and capacitor 36 to keep capacitor 36 charged and thus supply the control logic 38 with sufficient power when the triac 19 is off. Resistor 32 also functions to limit the power supply current and to maintain the proper timing pulse wave form when the triac 19 is off at values substantially similar to those current and wave form values as when the triac is on.

F. A bridge rectifier 27 functions as an AC/DC translator to provide dc control of the AC signal to the triac gate terminal 22. Rectifier 27 also functions to create the 120 Hertz synchronizing pulses which act as timing pulses for the control logic 38. The rectifier 27 also provides the unidirectional pulses which are filtered to virtually direct current (dc) for powering of the control logic.

G. The LED 34 functions as a visual light indicator to indicate the application of "hot" power from the AC power source 14, continuity to the AC load 15 and continuity from the load 15 to the common of the power source. The LED 34 stays lit regardless of whether the triac 19 is on or off. The LED 34 is in series with the pulses being fed by the bridge rectifier to the zener such that the LED constitutes a portion of the desired voltage drop across the parallel circuit 24 and, hence, is not a power draw on the system. The LED 34 also functions to clip the unidirectional pulses created by the rectifier 27 at a voltage level equal to the voltage drop across the zener 35 and the LED 24. The clipped pulses are conducted through the timing pulse branch 39. At the same time, the LED conducts the current (that would normally have created the peak of the voltage pulses in excess of the clipped portions) through the dc branch 28 to the zener 35 and capacitor 36, thus functioning as the source of energy to charge the capacitor 36 to a level established by the zener 35. The LED 34 also functions to prevent drainage of the current backwards from the capacitor 36 through the LED.

H. The zener 35 functions to establish the voltage at which dc power is supplied to the control light 38. The zener 35 functions as a voltage regulator to keep the voltage across the control logic 38 nearly constant with changes in AC power source voltage. The zener 35 also functions as the dominate voltage drop across the parallel circuit 24. Generally, the zener should be large enough to ensure sufficient voltage for the control logic 38, yet small enough so as not to impact upon the low line operation of the load 15.

I. The capacitor 36 functions to filter the unidirectional signals conducted by the LED 34 to create a virtually smooth dc signal for powering the control logic 38. (see FIGS. 2C and 3D) The capacitor 36 also functions as a source of charge supplying power to the control logic 38 during the on portion of each AC half cycle when on power is directly provided to the control logic by the AC power supply. The capacitor 36 functions, in conjunction with the power supply resistor 37, to drain the power supplied to the control logic 38 to below its off level of 3 volts (from its nominal level of 7.5 volts) in less than one second in order to allow the control logic "reset" (to off) function to properly operate when AC power is reapplied after a very short power failure. Although the values of the circuit elements may vary for different applications, the following specifications represent the presently most desirable example of the preferred embodiment:

| | |
|---|---|
| AC power supply (14) | 24 volts |
| TVS (17) | turns on above 35-40 volts |
| Triac (19) | Vgt = 0.5-1 volt |
| | Igt = 0.5-5 milliamps |
| first resistor (26) | 100 ohms |
| Bridge rectifier (27) | functions from 0.1-25 milliamps |
| | 0.7 volt drops across each diode |
| second resistor (30) | 27 ohms |
| third resistor (32) | 15K ohms |
| LED (34) | 50 microamps to 50 millamps with 1.5 volt drop maximum |
| zener diode (35) | breakdown voltage of 7.5 volts at as little as 50 microamps; handles up to 1 watt. |
| capacitor (36) | 2.2 micro-farads ±10%; breakdown greater than 7.5 volts (tantalum type) |
| capacitor (43) | .1 micro-farads; 250 volts AC |
| control logic (38) | CMOS part no. CD-4020 timer (multi-vibrator) circuit operating range: 3 to 18 volts, approx. 200 microamps (or less). |
| signal resistor (31) | 47K ohms |
| resistor (42) | 100 ohms |
| dc load resistor (37) | 560K ohms |

As expressed above, the control logic 38 includes, in a preferred embodiment, a CMOS 4020 timer which drives a transistor 33. An example of such a prior art timer is that CMOS,MC14020B 14-stage binary counter produced by Motorola. Further details of the exact connections of the timer (counter) to the pulse conductor branch 39, dc branch 40 and transistor 33 are not specifically discussed herein as they are considered obvious to one skilled in the art, and even a matter of design choice to one with skill in the art.

Figure 2A:
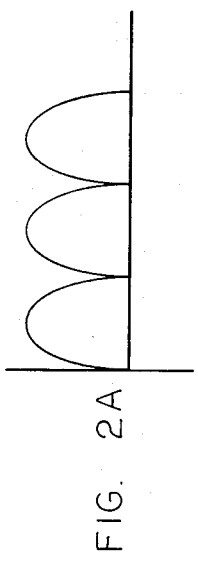
FIG. 2A is a voltage/time curve representing the full-wave rectified voltage wave form as developed across points E and F of the Bridge rectifier, when the control system is in the load-off-mode, in accordance with the present invention.
Figure 2B:
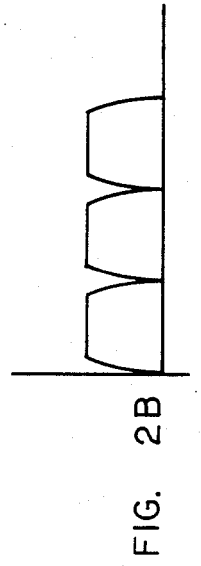
FIG. 2B is a curve representing the clipped timing pulses transmitting to the control logic of the control system in the load-off-mode as developed across the signal resistor 31, in accordance with the present invention.
Figure 2C:
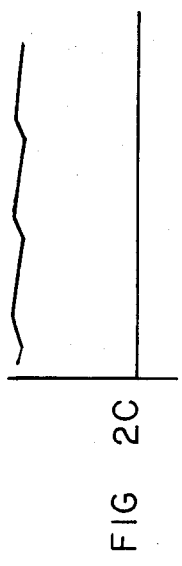
FIG. 2C is a voltage/time curve representing the filtered, dc voltage wave form as developed by the "dc power supply" and seen by the control logic of the control system in the load-off-mode, in accordance with the present invention.

Operation of the preferred embodiment—Start Up—The control system 10 of the present invention as seen in the preferred embodiment of the figure performs its function as follows. A cut is made in the power line 45 connecting the AC power source 14 with the load 15. Lead wire 11 of the control system 10 is connected to one free end of the power line 45 and lead wire 12 is connected to the other free end of the power line 45. Which lead wire 11, 12 is attached to which free end of the power line 45 is of no consequence in this embodiment. At the beginning of the first cycle of the AC voltage waveform there is no voltage across the triac 19 and, hence, the triac 19 is naturally off (in the non-conducting mode) and, therefore, the load 15 is off. In this way, the full voltage across the lead wires 11, 12 (ie. 24 volts in an energy management system) is provided across the parallel circuit 24. During the first half cycle the voltage across A and B rises. The voltage reaches a value sufficient to turn on all of the diodes in the parallel circuit 24, to breakdown the zener 35, allowing current to flow charging the power supply capacitor 36, activating the control logic 38. Voltage continues to rise reaching the maximum value across the lead wires 11,12. A unidirectional current and voltage is developed across the unidirectional branch 28 with a wave form developed across signal-load resistor 31 as represented in FIG. 2A. As a result of the clipping and isolating functions of the LED 34, a clipped voltage wave (max amplitude of 9 V in the given example) is sent along the shaped timing pulse branch 40 to the control logic 38 as a synchronizing pulse as represented in FIG. 2B; and what would have been the peak voltages in excess of the clipped amplitude do not occur because the peak currents are conducted through the low impedance dc branch 40 and around the high resistance of resistor 31. The dc branch 40 functions as the dc power supply for the control logic 38, and a representation of the filtered dc voltage wave is seen in FIG. 2C.

In the preferred embodiment "reset" circuitry is employed to not only assure proper operation of the logic when power is first applied, but also used to keep the triac 19 off for the first few cycles of the AC wave form so that the dc power supply charges to its full operating voltage. To accomplish this, the "reset" circuitry forces the logic switch 33 to be initially open during at least the mentioned first few cycles of the AC wave form. With the logic switch 33 open, the third resistor 32 is placed in line ("unshorted") in the unidirectional branch 28 and in the parallel circuit 24, thus creating relatively high impedance with a large voltage drop across the resistor 32. This large voltage drop across resistor 32 is so large that the available resultant voltage developed across resistor 30 (points C and B) is below the gate trigger voltage. Since resistor 32 has been carefully chosen relative to resistor 30 as previously discussed, the gate voltage and resulting gate current are sufficiently low to prevent firing (turn-on) of the triac 19 even at the highest AC line voltage normally encountered. The triac 19 cannot be turned on with logic switch 33 open.

Power needed to operate switching components within the control logic 38 is provided through the dc branch 40 in parallel with the zener diode 35 and the capacitor 36. Once active, the control logic 38 of the preferred embodiment closes then opens the logic switch 33 at predetermined, selectable time intervals. Since numerous design circuitry exists which will open and close a switch in parallel with the third resistor 32, the specific circuit elements will not be discussed herein. However, it is understood, that whatever the voltage and power requirements of the control logic 38, they must be met by the dc power supply. The control logic 38 of the preferred embodiment operates on aproximately between ranges of 3 to 18 volts and approximately 200 micro amps of current. Although the control logic 38 is designed to operate within the 3 to 18 volt range, the preferred embodiment provides, at most times, approximately 7.5 volts to the control logic 38 through the dc power supply. The voltage to the control logic 38 is determined by the breakdown value of the zener diode 35, which, in the example of the preferred embodiment, is 7.5 volts. By virtue of the zener action, the power supply capacitor 36 is charged to 7.5 volts each half cycle by the voltage peaks across resistor 32 exceeding 9 volts, turning the LED 34 on and allowing current to flow. The capacitor 36 filters the voltage or releases charge to the control logic 38 when the voltage across the dc branch 28 tries to drop below 7.5 volts. Once the control logic 38 has the first time been activated, the control system 10 will continuously provide power through the parallel circuit 24 in sufficient values to operate the control logic 38 in both the conducting and non-conducting modes (triac-on and triac-off modes) of the triac 19 as explained below.

Load-On—As the control logic 38 determines, in accordance with its programmed requirements, that it is time to turn the load 15 on, the control system must place the triac 19 in the conducting mode such that sufficient current will flow directly through main terminal 21 and main terminal 20 to the load 15. To accomplish this end, the control logic 38, at the determined timed interval, closes logic switch 33 thus shorting out or bypassing the third resistor 32. The impedance of parallel circuit 24 between points A and C is thereby lowered, lowering the voltage drop across points A and C. The lower voltage drop between points A and C results in a larger gate voltage being developed between points C and B across resistor 30. Since resistor 30 has been carefully chosen relative to resistor 26 as previously discussed, the resulting gate voltage equals or exceeds the gate trigger voltage (now that resistor 32 has been shorted from the circuit 24) and the gate current entering triac terminal 22 equals or exceeds the gate trigger current. As a result of this gate signal matching the gate trigger current and voltage, the triac 19 will fire, or turn on to its current conducting mode. As is a characteristic of the triac 19, when the triac is turned on, the voltage across the triac (and thus across the parallel circuit 24) drops to a steady on-state voltage 48 (see FIG. 3A). The minimum saturation level will vary for different designs of triac 19, but in the preferred embodiment, the typical voltage across the triac, while the triac is on, is approximately 1.5 volts. Furthermore, as is characteristic of a triac, the triac 19 will turn off cyclically as the alternating current approaches the zero axis between the plus and minus holding current (passing through the two main terminals). Therefore, at each half cycle of the alternating current, the triac 19 must be again turned on by the proper gate signal developed by the parallel circuit (absent the third resistor 32).

Figure 3A:
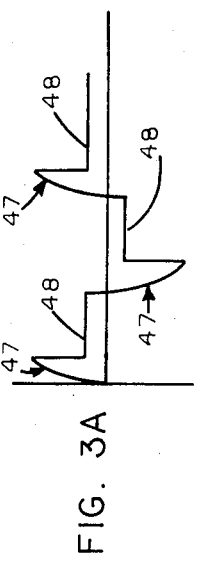
FIG. 3A is a voltage/time curve representing the alternating, voltage wave form as developed across the triac of the control system when the control system is in the load-on-mode in accordance with the present invention.

Each time the triac 19 turns off (at each half cycle), an off-state voltage is developed across the main terminals 20, 21 of the triac before the triac 19 turns back on. The elements within the parallel circuit 24 function to predetermine a minimum threshold off-state voltage drop across points A and B (main terminals 20, 21) which must be developed each time the gate trigger voltage across points B and C is developed. This minimum threshold voltage 47 is seen as a narrow alternating spike 47 in the voltage wave across the triac main terminals 20, 21 as seen in FIG. 3A. Therefore, the triac 19 will not turn on until this predetermined, minimum threshold off-state voltage across A and B is developed. In accordance with the present invention, the predetermined threshold voltage drop 47 must be sufficient to satisfy the requirements of all of the elements in the parallel circuit 24 including the bridge rectifier diodes 27a, 27b, 27c, 27d, the LED 34, and the zener 35 as well as the gate trigger voltage before the triac will turn on. In the example of the preferred embodiment, this minimum threshold voltage 47 is approximately 15 volts (resistor 32 is shorted from the circuit). Absent the elements of the present invention in the parallel circuit 24 between points A and C, a typical triac 19 as used in the present example will develop a peak off-state voltage of perhaps 2 to 2.5 volts. Hence, the elements of the present invention must enhance the peak off-state voltage of the triac to reach the threshold voltage 47. The elements of the parallel circuit 24 insure that at least the minimum threshold off-state voltage 47 is developed across points A and B each half-cycle before the triac turns on and settles to its on-state voltage 48.

Figure 3B:
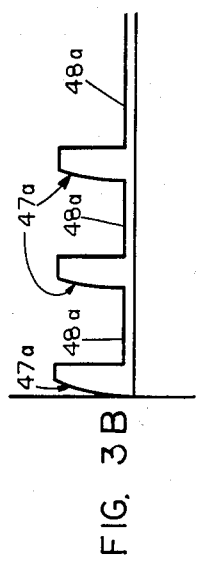
FIG. 3B is a voltage/time curve representing the full-wave rectified voltage wave form as developed across the signal resistor 31 in the unidirectional branch of the bridge rectifier when the control system is in the load-on-mode in accordance with the present invention.
Figure 3C:
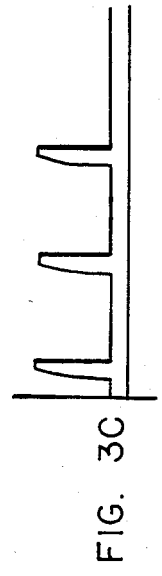
FIG. 3C is a curve representing the timing pulses transmitted to the control logic of the control system when the control system is in the load-on-mode in accordance with the present invention.
Figure 3D:
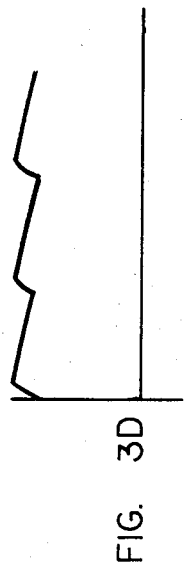
FIG. 3D is a voltage/time curve representing the filtered, dc voltage wave form as developed by the "dc power supply" as seen by the control logic when the control system is in the load-on-mode in accordance with the present invention.

It is this minimum threshold off-state voltage 47 that provides the impulse of power to keep the dc power supply to the control logic 38 alive when the triac 19 is on. With the logic switch 33 shorting out resistor 32 and the control system 10 in the load-on mode, a voltage of the wave form seen in FIG. 3A is developed across the triac 19 as described above. That portion of the voltage loss across points E and F as developed across signal resistor 31 is seen as the full wave rectified wave form of FIG. 3B. Seen are the respective portion 47 of the threshold off-state voltage 47 and the portion 48a of the on-state voltage 48. FIG. 3B indicates that the on-state voltage 48 has been virtually eliminated by voltage drops across the first resistor 26, second resistor 30 and the diodes of the bridge rectifier 27. Each half cycle, before the triac 19 turns on, the impulse of off-state voltage resupplies any lost charge to the power supply capacitor 36. Again the LED 34 functions to clip the voltage (in this case only the off-state voltage 47) sending clipped, synchronizing pulses (see FIG. 3C) along timing pulse branch 39; and to conduct the peak currents to the dc branch for charging the power supply capacitor 36 for all voltages above 9 volts across signal resistor 31. Then, for the remaining portion of each half cycle, the triac 19 is on and the voltage across the triac main terminals 20, 21 drops to the lower, on-state voltage 48. The on-state voltage 48 (1.5 volts in the example) is generally too low to breakdown the zener 36 and LED 34 to provide power to the control logic 38. Therefore, during the triac on-mode (current conducting mode) of each half cycle, the power supply capacitor 36 discharges to supply power to the control logic 38. The LED 34 blocks the charge from flowing any other direction than into the control logic 38. The capacitor 36 is recharged each half cycle by the impulse of threshold voltage 47 (see FIG. 3D). In the preferred embodiment the signal resistor 31 provides a current by-pass circuit to maintain at least a minimum current flow through the bridge rectifier 27 for all voltages below 9 volts across signal resistor 31 during which time the zener 35 and LED 34 are not on, and so do not conduct current in either the on or off modes of the triac 19. This maintains a proper timing pulse wave shape in both the on and off modes of the triac 19. It will be noted, with reference to FIGS. 2C and 3D, that there is virtually no difference in the average dc voltage seen by the dc power supply in the load-off mode (see FIG. 2C) and in the load-on mode (see FIG. 3D).

Load-Off—When the control logic 38 determines that it is time to turn the load 15 off, the triac 19 must be turned off, that is, placed in its non-conducting mode. To turn the triac 19 off, the control logic 38, at the predetermined time interval, opens the logic switch 33 thus placing ("unshorting") the third resistor 32 into the parallel circuit 24. The impedance of the parallel circuit 24 between points A and C is thereby increased resulting in a large voltage drop across points A and C. The voltage drop across A/C is now so large that the resultant gate voltage developed across resistor 30 is below the gate trigger voltage. Now, as the alternating current passing through the main terminals 20, 21 of the triac 19 drops below the holding current and the triac is turned off in its normal cyclical pattern, there is insufficient gate signal to turn the triac back on. Thus, the triac 19 remains in its non-conducting (triac-off) mode. In this state, substantially all of the voltage is again across the parallel circuit 24 thus providing sufficient power to the dc power supply and control logic 38. Although current continues to flow through the parallel circuit 24 along lead wires 11 and 12 to the load 15, the impedance across the parallel circuit 24 is so high, due to the presence in the circuit of resistor 32, that the resulting current flowing to the load is insignificant as compared to the current required to operate the load. Therefore, the load 15 will be off. As the control logic 38 again decides that the proper time interval has lapsed for the load 15 to again be turned on, the circuitry closes the logic switch 33 to again turn on the triac as mentioned above. The control logic 38 continues its on/off manipulations of the triac 19 in accordance with the logic design.

Figure 3E:
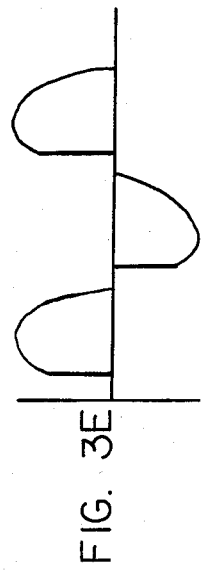
FIG. 3E is a voltage/time curve representing the voltage delivered to a load, less the voltage loss across the thyristor, in accordance with the present invention.

It is here noted for clarity that the design of the control logic 38 determines the load-on/load-off time intervals (for example, three minutes on and three minutes off). Whereas, in the load-on mode, the triac-on/triac-off cycle appears every half cycle of the 60 cycle per second power supply. In the load-on mode, the triac 19 is on for each half cycle of the AC wave form only after the threshold voltage 47 has been exceeded for that half cycle. Since the area under the narrow threshold voltage (47) curve, as seen in FIG. 3A, is so small in contrast to the remaining AC waveform area delivered to the load, as seen in FIG. 3E, the additional RMS AC voltage drop beyond the existing 1.5 volt triac-on voltage drop is small (approximately 0.5 volts in the disclosed embodiment), and the resultant additional RMS power loss to the load 15 is insignificant. The triac is always in the triac-off mode during the load-off mode.

The preferred embodiment comprises an added feature which shall be termed "protective restart". In the event that power is totally lost as by a failure of the AC power source 14, it is preferred that, the load 15, which is turned off by the power loss, not turn immediately back on once the AC power resumes. Therefore, it is preferrably desired that, when the AC power comes back on, the resistor 32 is unshorted and the triac 19 is off. This forces the control logic 38 to go through its typical timing cycle before the load 15 is turned back on at some predetermined later point in time. When the voltage to the control logic 38 of the preferred embodiment falls below 3 volts, its designed minimum operating voltage, the logic is effectively off. It is preferred that, when the logic is turned back on, the logic switch 33 is initially open and the logic begins to count time again at zero and must reach a later time (ie. three minutes) before logic switch 33 is closed. To this end, the dc load resistor 37 functions to drain down the power supply capacitor 36 in a very short period of time so that, if AC power is lost, the dc power supply to the control logic 38 will quickly dissipate to below the minimum operating voltage. In the example of the preferred embodiment, the dc load resistor 37 is sufficiently high (approx. 560K ohms.) to not sufficiently impact the normal dc power supply function when AC power is on; but low enough to force the power supply capacitor voltage from 7.5 volts to under 3 volts in less than one second. Thus if the AC power fails for greater than one second, when AC power is reapplied, the control logic "reset" circuitry will force the logic switch 33 to open and control logic timers will begin counting again at time-zero. The load 14 will not be turned back on until the proper time interval (ie. three minutes) determined by the logic 38 has lapsed. The resistor 37 is not so high relative to the chosen capacitor 36 as to dissipate the capacitor 36 to below 3 volts within a single half cycle of the 60 cycle AC power source, and thus there is no fear of the dc power supply to the logic 38 dissipating during the triac on portion of a half cycle while the system 18 is in the Load-on mode.

The RC circuit 41 functions to lag the voltage across the triac 19 relative to the current to shift the phase in a manner known in the art, such that the voltage/current phase difference caused by an inductive load 15 will not accidentally cause the triac 19 to fire. In the preferred embodiment, the RC circuit 31 is to always remain as part of the control system 10 in order that a single control system apparatus 10 can be used with either an inductive or resistance load 15 and for most inductances encountered. Therefore, the RC circuit is pre-designed to properly function for the worse expected inductance. The value of the RC circuit 41 will have some impact on the design of the elements of the parallel circuit 24. Therefore, the values of the elements of the parallel circuit are preferrably chosen after the RC circuit 41 has been established.

Whereas the present invention has described the positioning of elements in particular locations relative to one another and in particular locations either between the triac main terminal 20 and gate terminal 22 or between the triac main terminal 21 and gate terminal 22, it is understood that other embodiments of the present invention will rearrange the location of elements relative to one another and relative to the triac terminals and continue to successfully perform within the scope of the present invention, although the performances of these alternate embodiments are generally less preferred.

While this invention has been described in specific detail with particular reference to the preferred embodiment thereof, it will be understood that variations and modifications can be effected within the spirit and scope of the invention as described herein before and as defined in the appended Claims.

What is claimed is:

1. Apparatus for controlling the operation of a load, which load is provided by a circuit with alternating current from an AC power source, said apparatus comprising:

a bidirectional thyristor positioned in series with the load and the AC power source, said thyristor including a first main terminal, a second main terminal, and a gate terminal;

a first resistance element positioned in a parallel circuit in parallel with said thyristor between said first main terminal and said gate terminal;

second resistance element selectively shorted and unshorted out of and into said parallel circuit in series with said first resistance element and between said first main terminal and said gate terminal of said thyristor;

third resistance element positioned in said parallel circuit between said gate terminal and said second main terminal of said thyristor; and control logic circuitry powered by power provided by the voltage drop across said thyristor, said control logic circuitry including means for shorting and unshorting said second resistance element out of and into said parallel circuit in series with said first resistance element, whereby unshorting of said second resistance element into said parallel circuit places said thyristor in a nonconducting mode and shorting of said second resistance element out of said parallel circuit places the thyristor in a current conducting mode, thus turning the load off and on, respectively.

2. Apparatus of claim 1, wherein said means for shorting and unshorting said second resistance element out of and into said parallel circuit comprises a first switch element in parallel with said second resistance element, and switch activating means for opening and closing said first switch element at predetermined, selectable intervals.

3. Apparatus of claim 1, further comprising a full-wave bridge rectifier positioned in said parallel circuit between said first main terminal and said gate terminal of said thyristor, said rectifier defining a unidirectional branch of unidirectional current, and a voltage regulator positioned in said unidirectional branch of said rectifier, wherein said second resistance element is positioned in said unidirectional branch in series with said voltage regulator.

4. Apparatus for providing power to a control logic circuitry, comprising:

AC power lead for connecting to an AC power source;

return lead for connecting to a load;

an AC switching device connecting between said power lead and said return lead, said AC switching device requiring the existence of a minimum voltage drop across said switching device before current can flow through said switching device between said power lead and said return lead:

triggering circuit connecting said power lead and said return lead in parallel with said AC switching device including means for developing a threshold voltage drop across said switching device at least equal to said minimum voltage drop; and power circuit means associated with said triggering circuit for converting at least a portion of said threshold voltage drop across said switching device into the power required to drive a control logic circuitry while current is flowing through said switching device, said power circuit means comprising rectification means for providing a unidirectional current in a dc branch of said triggering circuit, a zener diode positioned in said dc branch, a capacitor positioned in said dc branch in parallel with said zener diode, and terminal means for connecting control logic circuitry to said dc branch in parallel with said zener diode and said capacitor; and a diode positioned in said dc branch in series with the parallel combination of said zener diode, said capacitor and said terminal means, whereby said diode and said zener diode combine to clamp the unidirectional current at a desired value.

5. Apparatus for providing power to a control logic circuitry, comprising:

a bidirectional thyristor switching device for connecting in series between an AC power source and a load, said thyristor switching device including a first main terminal, a second main terminal and a gate terminal a first resistor in parallel with said switching device between said first main terminal and said gate terminal;

a second resistor in parallel with said switching device between said gate terminal and said second main terminal;

a full wave bridge rectifier in series with said first resistor between said first resistor and said gate terminal, said bridge rectifier defining a unidirectional branch in a portion of the circuit between said first resistor and said gate terminal for providing unidirectional current, said unidirectional branch having a unidirectional output point and a logic ground reference point;

a zener diode positioned in said unidirectional branch in series with said first resistor;

a capacitor positioned in said unidirectional branch in parallel with said zener diode;

a light emitting diode positioned in said unidirectional branch in series with the parallel combination of said zener diode and said capacitor; and terminal means for connecting control logic circuitry to said unidirectional branch, said terminal means including a first terminal for connecting the control logic circuity to the positive side of said zener diode and said capacitor, in parallel with said zener diode and said capacitor, and a second terminal for connecting the control logic circuitry to said logic ground reference point of said unidirectional branch.

6. A self powered, self regulated, electronic AC control apparatus, comprising:

AC power lead for connecting to an AC power source;

return lead for connecting to a load;

a bidirectional thyristor switching device connected between said power lead and said return lead, said thyristor switching device including first main terminal connected to said power lead, a second main terminal connected to said return lead, and a gate terminal;

a first resistor in parallel with said device between said first main terminal and said gate terminal;

a full-wave bridge rectifier in series with said first resister between said first resistor and said gate terminal, said bridge rectifier defining a unidirectional branch in a portion of the circuit between said first resistor and said gate terminal for providing unidirectional current;

a zener diode positioned in said unidirectional branch in series with said first resistor;

a capacitor positioned in said unidirectional branch in parallel with said zener diode; and second resistor selectively switchable into and out of said unidirectional branch in series with said parallel combination of said zener diode and said capacitor;

control logic circuitry connected to said unidirectional branch to the positive side of said zener diode and said capacitor, in parallel with said zener diode and said capacitor, said control logic circuitry including switch means for selectively switching said second resistor in and out of said unidirectional branch.

7. Apparatus of claim 6, further comprising a light emitting diode positioned in said unidirectional branch in series with said zener diode and said capacitor.

8. Apparatus of claim 6, further comprising a third resistance element between said gate terminal and said second main terminal of said thyristor.

9. A self-powered, self-regulated, electronic AC control apparatus, comprising:

a bidirectional thyristor for connecting in series between an AC power source and a load, said thyristor including a first main terminal, a second main terminal and a gate terminal, said thyristor defining a current conducting mode during which current flows through said thyristor in sufficient amperage to operate the load and a current blocking mode during which substantially no current flows through said thyristor to operate the load, said thyristor requiring the existence of a trigger voltage across said gate terminal and said first main terminal before said thyristor enter the current conducting mode;

switching circuit connected in parallel with said thyristor for series connection between the AC power source and the load, said switching circuit including voltage means for developing voltage across said gate terminal and said first main terminal of said thyristor to place said thyristor in the current conducting mode, said switching circuit defining a load-on mode during which said voltage means develops said trigger voltage to place said thyristor in the current conducting mode supplying current to the load through said thyristor, and said switching circuit defining a load-off mode during which said trigger voltage is not developed across said gate terminal and said first main terminal of said thyristor by said voltage means and during which current flowing from said switching circuit to the load is insufficient to operate the load;

logic means associated with said switching circuit for alternately placing said switching circuit in said load-off mode and said load-on mode;

said switching circuit comprising power converting means for converting power from the AC power source into power for maintaining continuous operation of said logic means during both the load-off mode and load-on mode;

first multiple function means for translating AC signals from the AC power source to unidirectional signals which are to be filtered to DC signals to power said logic means, and for creating 120 cycle per second synchronizing pulses to be used in control logic timing, and for conducting an AC signal to the gate terminal of said thyristor;

second multiple function means for indicating the on/off operation of said switching circuit, and for clipping the synchronizing pulses created by said first multiple functions means for uniform amplitude timing pulses, and for conducting current to the logic means;

third multiple functions means for regulating the voltage supplied to said logic means, and for supplying a minimum voltage to said logic means; and forth multiple function means for filtering the unidirectional signals from said first multiple function means to provide approximately DC signals to the logic means during the current blocking modes of said thyristor, and for providing charge to the logic means during the current conducting modes of said thyristor.

10. Apparatus for controlling the operation of a load, which load is provided by a circuit with alternating current from an AC power source, said apparatus comprising:

a bidirectional thyristor positioned in series with the load and the AC power source, said thyristor including a first main terminal, a second main terminal, and a gate terminal;

a first resistance element positioned in a parallel circuit in parallel with said thyristor between said first main terminal and said gate terminal;

a full-wave bridge rectifier positioned in said parallel circuit between said first main terminal and said gate terminal of said thyristor, said rectifier defining a unidirectional branch of unidirectional current;

a zener diode positioned in said unidirectional branch of said rectifier in series with said first resistor;

a second resistance element selectively switchable into and out of said unidirectional branch of said rectifier in series with said zener diode;

control logic circuitry powered by power provided by a portion of the voltage drop across said thyristor appearing in said unidirectional branch of said rectifier, said control logic circuitry including a first switch element in parallel with said second resistance element and switch activating means for opening and closing said switch element at predetermined selectable intervals; and third resistance element positioned in the circuit between said gate terminal and said second main terminal of said thyristor.

* * * * *